July 3, 1928.
I. J. WATKINS
AUTOMOBILE STEERING GEAR
Original Filed Sept. 5, 1924
1,675,520
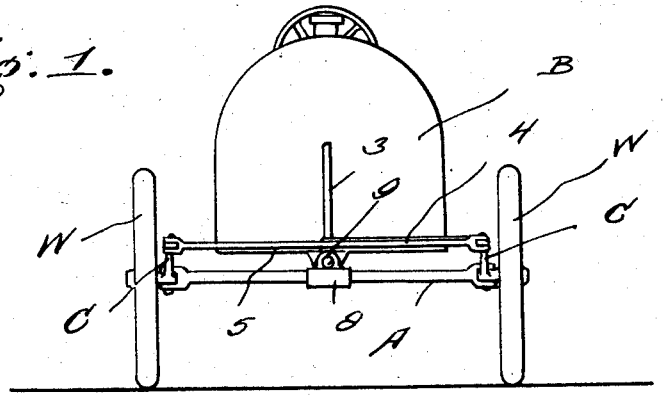
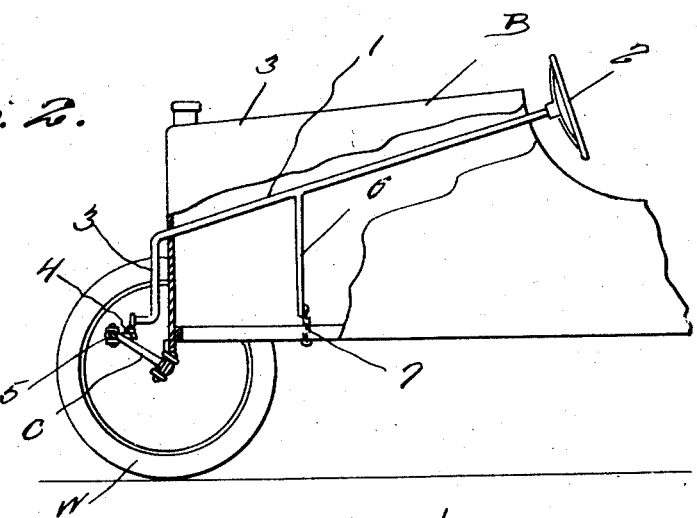
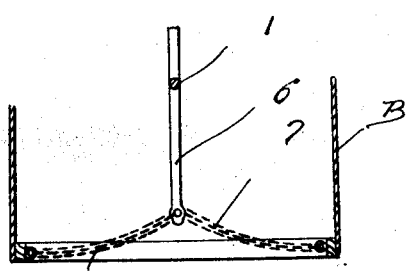
Inventor
I. J. Watkins
By Clarence A. O'Brien
Attorney Patented July 3, 1928.

1,675,520

UNITED STATES PATENT OFFICE.

IRAH JUNIOR WATKINS, OF CINCINNATI, OHIO, ASSIGNOR TO DUDLEY ANDREWS, OF INDIANAPOLIS, INDIANA, AND JAMES L. ARNOUT, OF BUFFALO, NEW YORK.

AUTOMOBILE STEERING GEAR.

Application filed September 5, 1924, Serial No. 736,102. Renewed March 22, 1927.

This invention relates to an improved steering gear or mechanism for automobiles and while it may be used in connection with full sized machines, it has been especially devised for use in conjunction with miniature automobiles of a type adapted to be driven by monkeys.

Before I proceed with the description of the features and advantages of this invention, I would like to point out that the type of machine upon which I propose to apply my invention is, as before stated, one which is adapted to be driven by a monkey or the like, these machines being automatically propelled and being steered by the animal itself. Machines of this class are seen more frequently on show grounds where motor dromes and bowls are present. Of course, since an animal of this class does not possess the necessary degree of knowledge for safe steering, it is usually customary to provide the top of the bowl with a laterally and inwardly extending rim to prevent them from riding out. To make the driving operation more realistic and impressive to the onlookers however, it is desirable to permit the animal to steer the machine, but under the control of limiting means and not to a dangerous degree. It is therefore my purpose to provide a steering mechanism which is particularly adaptable in carrying out this end in that it permits a limited movement of the front guiding wheels of the machine.

It follows that the prime feature of the invention is to provide a steering mechanism for machines of this class which is limited in its movement, that is movable to a predetermined degree in opposite directions to control the angling of the guide wheels from left to right.

It is another feature of the invention to pivotally mount the front axle on a horizontal axis on the frame of the car so that a rocking movement is given to the axle to permit canting or inclining of the wheels to make is appear that the amount of steering done by the monkey is greater than actually takes place. It is therefore correct to state that the improved device in reality is a "fake steering mechanism" for miniature automobiles.

The features and advantages of the construction employed for carrying the conception into effect will become apparent from the following description and drawing.

In the accompanying drawing forming a part of this specification and in which like numerals are employed to designate like parts throughout the same:

Figure 1 represents a front elevation of a small automobile equipped with a steering gear constructed in accordance with the present invention.

Figure 2 is a side elevation with a portion of the front broken away and shown in section to disclose the structure more clearly.

Figure 3 is a cross section taken substantially on the plane of the line 3—3 of Figure 2.

In the drawing, the letter B designates the body of the machine, A designates the axle, the letter W refers to the front wheels, and the letter C indicates the arms of the usual steering knuckles at the opposite ends of the front axle.

Referring now to the invention itself, we observe that it comprises a forwardly and downwardly inclined steering rod 1, turnable about its axis and at the upper end of which is the hand wheel 2 adapted to be grasped by the monkey. The forward end of the rod extends through a bearing opening formed in the dummy radiator, this end being directed downwardly as at 3 to provide a crank arm and the lower end of this crank arm being directed forwardly and connected with a link 4 which is in turn connected at its outer end with the right hand steering knuckle or with the corresponding end of the cross rod 5 between the arms of the two steering knuckles. In other words, so far as described the present steering mechanism simulates that found on full sized automobiles of the present day. With the arrangement just described it is obvious that movement of the wheel 2 from left to right will swing the wheels W about their vertical pivots to angle them to direct the car either toward the right or left. As before stated, it is desirable to limit this angling of the wheels so as to give the desired steering appearance but to prevent the car from riding out of the bowl. In carrying out this end I provide the intermediate portion of the rod 1 with the depending leg 6. Connected to the lower end of this leg are two chains 7, also connected opposite side portions of the automobile frame, which, as is obvious, will limit the rotation of the rod 1 and in turn limit the turning movement of the guide wheels W. It is to be noted that a bracket 8 is fixed to the intermediate portion of the axle A and is connected by a single horizontal pivot pin 9 to the body of the automobile. So, it will be seen that the wheels in addition to swinging about the usual vertical axis provided by the steering knuckles may also cant or incline with respect to the line of travel by swinging about the pivot pin 9. With this dual movement of the guide wheels, while the actual steering is not to a great degree, to the onlookers it appears to be much greater, and the scene of the monkeys actually steering the automatically driven machines about the bowl is amazing, yet the degree of steering is not such as to render the travel unsafe for the animal.

By carefully considering the foregoing description in connection with the drawing, the inventive intent, the structure and arrangement of parts, and the method of operation will be comprehended. A more lengthy description is therefore deemed to be unnecessary.

Having thus described the invention, what I claim is:—

1. In a device of the class described, an automobile frame, a front axle pivotally connected on a horizontal pivot at a point between its ends to the intermediate portion of the frame for permitting rocking of said axle upon said pivot, steering wheels disposed at the outer ends of said axle, steering knuckles interposed between the wheels and the ends of the axle, a connecting rod between the arms of said steering knuckles, a link having connection with one of the steering knuckles, a rod turnable about its axis and connected at one end to the inner end of said link, a depending leg carried by the intermediate portion of said rod, and a pair of separate chains connected to the lower end of said leg and at their outer ends to the frame of the automobile.

2. In an automobile and in combination, an axle, a frame pivotally connected to the axle, steering wheels on and movable relative to the axle, a steering rod turnable about its axis on the frame and connected with the steering wheels, and means connecting the frame and the steering rod to control turning of the latter; said means including a pendent leg on the rod, and means connecting said leg and the side portions of the frame at opposite sides of the leg.

In testimony whereof I affix my signature.

IRAH JUNIOR WATKINS.